United States Patent
Calloway et al.

[11] Patent Number: 5,146,404
[45] Date of Patent: Sep. 8, 1992

[54] ELECTRONIC MAINTENANCE SUPPORT WORK STATION

[75] Inventors: Jack D. Calloway, Orlando, Fla.; Raymond F. Holzer, Pittsburgh, Pa.; Stephen E. Matheny, Altamonte Springs; Gary W. Orwig, Winter Park, both of Fla.

[73] Assignee: Westinghouse Electric Corporation, Pittsburgh, Pa.

[21] Appl. No.: 909,346

[22] Filed: Sep. 19, 1986

[51] Int. Cl.[5] ............... G06F 15/21; G06F 15/24
[52] U.S. Cl. .................. 364/401; 364/403; 340/717
[58] Field of Search ............ 364/521, 401, 402, 403, 364/300; 340/750, 707, 712, 716, 717, 721

[56] References Cited

U.S. PATENT DOCUMENTS

| | | | |
|---|---|---|---|
| 3,757,037 | 9/1973 | Bialek | 364/900 X |
| 4,202,041 | 5/1980 | Kaplow et al. | 340/712 |
| 4,459,663 | 7/1984 | Dye | 364/403 |
| 4,481,412 | 11/1984 | Fields | 235/472 |
| 4,550,315 | 10/1985 | Bass et al. | 340/703 |
| 4,570,217 | 2/1986 | Allen et al. | 364/188 |
| 4,591,983 | 5/1986 | Bennett et al. | 364/403 X |
| 4,656,591 | 4/1982 | Goldberg | 364/403 X |
| 4,661,811 | 4/1987 | Gray et al. | 340/744 |
| 4,672,683 | 6/1987 | Matsueda | 382/57 |
| 4,730,252 | 3/1988 | Bradshaw | 364/403 |
| 4,752,908 | 6/1988 | Bouillot | 364/900 |
| 4,847,604 | 7/1989 | Doyle | 340/706 |
| 4,884,068 | 11/1989 | Matheny et al. | 340/707 |
| 4,899,292 | 2/1990 | Montagna et al. | 364/401 |

FOREIGN PATENT DOCUMENTS 2190569 11/1987 United Kingdom ............... 340/717

OTHER PUBLICATIONS

*Sales & Marketing Management,* Apr. 5, 1982, "Trans-Matic Manufacturing...", pp. 14, 15 (abstract only).
*Videodisc and Optical Disk,* Jul.-Aug. 1985, "Product Search System...", pp. 244-247.
IEEE CG & A, Apr. 1985, Takala, "User Interface Management System with Geometric Modeling Capability: A CAD System's Framework", pp. 42-50.
Matheny et al, "Ordering Parts Via Videodisc and Computer", EITV, Jun. 1984, pp. 33-35.

*Primary Examiner*—Dale M. Shaw
*Assistant Examiner*—David Huntley
*Attorney, Agent, or Firm*—Leydig, Voit & Mayer

[57] ABSTRACT

An electronic maintenance support work station employs a text screen and graphics screen on which text records and part graphics are displayed. The user can sequence through various levels of hierarchy of the product structure as a search is made for a needed part. An item activated on the text screen is automatically targeted on the graphics screen. Part detail information is presented to facilitate decision making when an order point in the search is reached. Direct part or stock number entries can also be entered if the user desires to bypass a search.

21 Claims, 11 Drawing Sheets

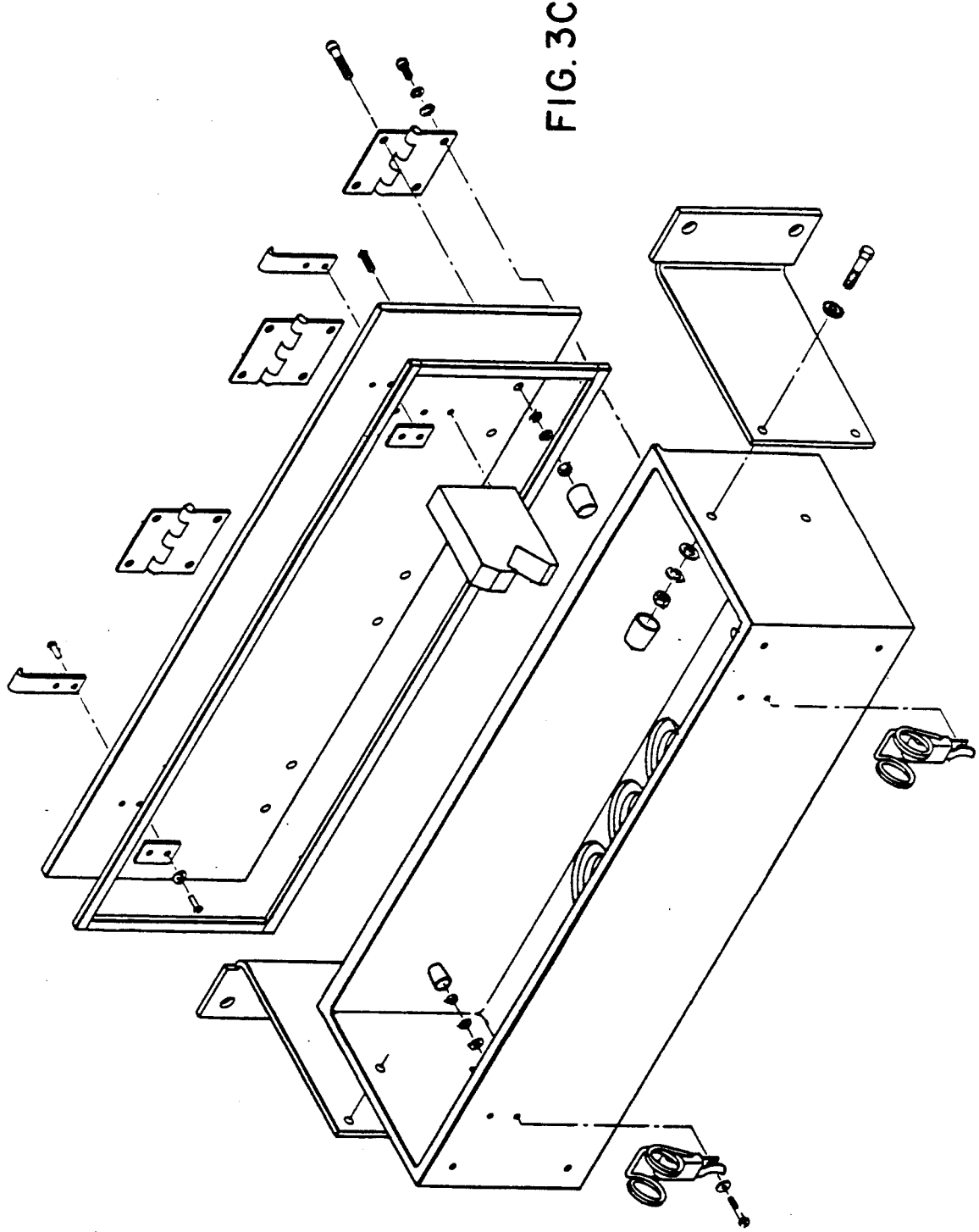

ELECTRONIC MAINTENANCE SUPPORT WORK STATION

BACKGROUND OF THE INVENTION

The present invention relates to electronic maintenance support (EMS) technology and more particularly to computerized work stations employed at customer, distributor or manufacturer locations to provide electronic support for the maintenance and repair of manufactured products or systems.

With increasing application of digital and electronic technology to electronic product maintenance support, better management of product use can be achieved through higher product/system availability, more economic and more efficient control over product/system maintenance and repairs, and more highly informed maintenance/repair decision making.

In an article entitled "Ordering Parts Via Video-disc and Computer" in the June 1984, issue of EITV magazine, there is described a parts ordering system that forms a basic element of an electronic product maintenance support system. As described there, that system employs a screen that displays text information and a second screen that displays graphic illustrations of the assemblies, subassemblies and components of a system or product supplied by a manufacturer to a user. The product, for example, may be a power plant turbine supplied to an electric utility company, it may be a transit car supplied to a public transit authority, or it may be an automobile supplied to an end user.

The general idea applied in the EMS work station is that product parts information normally made available by the manufacturer in a paper catalog, is made available through electronic displays such so that the information is more accessible and more usefully presented. The graphic screen is operated to show the product configuration in hierarchical order from the general to the most detailed level. Through coordinated control, the text screen always shows text material related to the particular product parts or assemblies shown on the graphic screen.

A laser disk is employed as the storage medium for the product graphics. A programmed computer system controls the laser disc and data memories to display graphic and text information on the two screens according to the level of product information selected for display. Typically, the work station operator may scroll through the product graphics and text in hierarchical order as a search is made for the part or parts that may be needed for a repair or for a scheduled maintenance. Once the part or parts are identified, an order can be entered and submitted through a communication link with the supplier's purchasing office.

To enhance EMS work stations like the integrated parts maintenance station described in the EITV article, the data structures and the programming used with the data structures in the operation of the work station may be improved to provide better functionality from which maintenance and repair decisions can be made by the user. Better functionality can be achieved through better organization of data structures and through better programmed coordination and sequencing and/or control of work station hardware and the work station data base.

Thus, it is desirable that text and graphic displays be structured, sequenced and interrelated to facilitate better parts identification and better parts procurement operations and generally to facilitate better management decision making. The present invention is accordingly directed to achieving improvements in EMS work stations to realize these ends.

SUMMARY OF THE INVENTION

An EMS work station includes a first display screen for displaying text information related to various assemblies, subassemblies and parts of a product serviced by the station. A second display screen displays graphic illustrations of the product assemblies, subassemblies and parts. Means are provided for storing a plurality of text files with each text file containing predetermined, i.e., statics data associated with a product assembly, subassembly or part at a particular level of an hierarchical organization of the product structure. Means are also provided for storing a plurality of graphics with each graphic containing an illustration of a product assembly, subassembly or part at a particular level of the hierarchical organization of the product structure. Each text file is linked with a corresponding graphic. User selections are made relative to the text screen or the graphic screen. Means are provided for detecting called text files or graphics and for controlling the storing means to retrieve the called text files or graphics and its linked counterpart. The text file and graphic accessed under call are displayed. The file and graphics controlling means respond to the graphic selection means to sequence through the product hierarchy as part selections are made from the graphic screen, thereby enabling the product structure to be searched for an assembly, subassembly or part needed for maintenance purposes. The file and graphics controlling means respond to the text selection means to identify a text field item selection. Means are provided for graphically indicating on the graphic screen the assembly, subassembly or part corresponding to the identified text field item.

BRIEF DESCRIPTION OF THE DRAWINGS

FIGS. 3A–3F show an illustrative hierarchical set of graphics which show a transit car structure from the most general level to the lowest and most detailed level.

DESCRIPTION OF THE PREFERRED EMBODIMENT

Figure 1A:
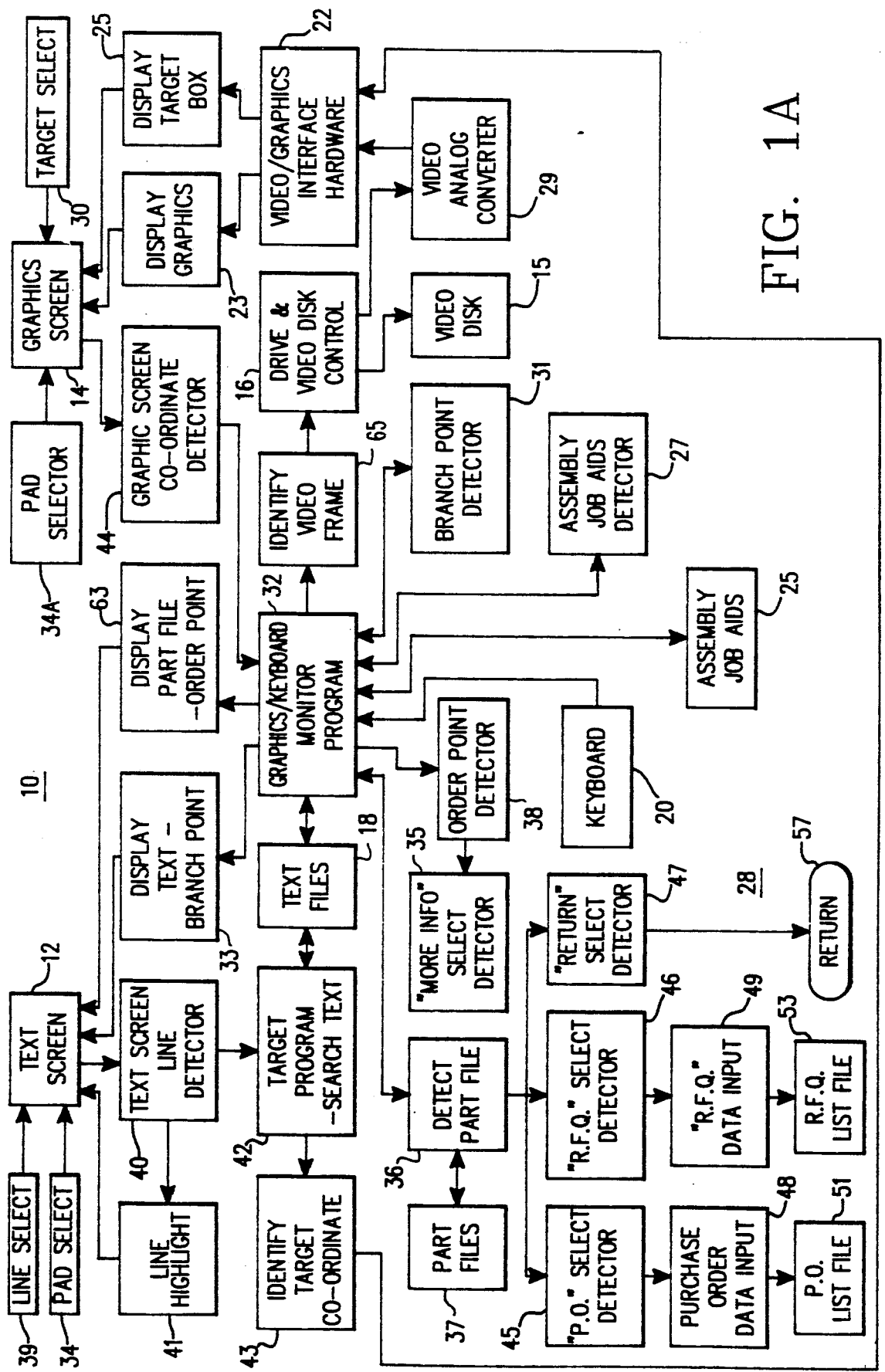
FIG. 1A shows a functional block diagram of an electronic maintenance support (EMS) work station arranged in accordance with the principles of the invention.

More particularly, there is shown in FIG. 1A an EMS work station 10 having a plurality of screens, in this case text screen 12 and a graphics screen 14. The work station 10 is generally operable to provide assistance to the user of a product in managing the use and maintenance of that product. To this end, a computer based interactive video disk system is employed to display graphics, i.e., up to three-dimensional images as in FIGS. 3C, 3D, and 3E, of the serviced product on the screen 14 while displaying on the screen 12 text information respectively pertaining to the displayed graphic.

The new functionality described herein is specifically applied to the two screens 12 and 14. However, with the use of windowing or other screen sharing techniques, the new functionality of the present invention can be applied to a single screen perhaps with some loss of visual facility for the user. Therefore, when reference is made herein to two (or more) screens with respect to application of the invention, it is meant to refer to either one screen or a plurality of screens.

Figure 3A:
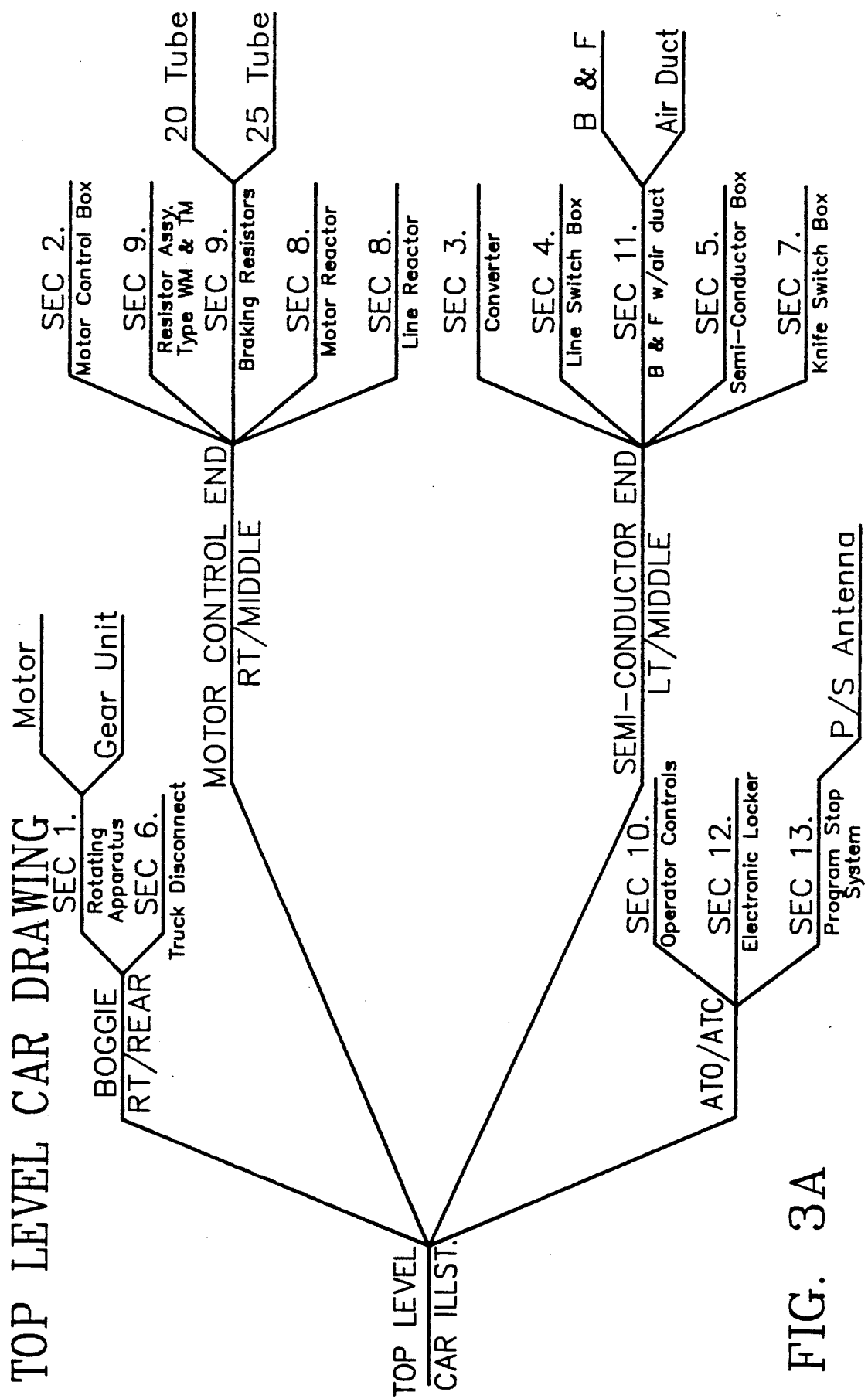
Figure 3B:
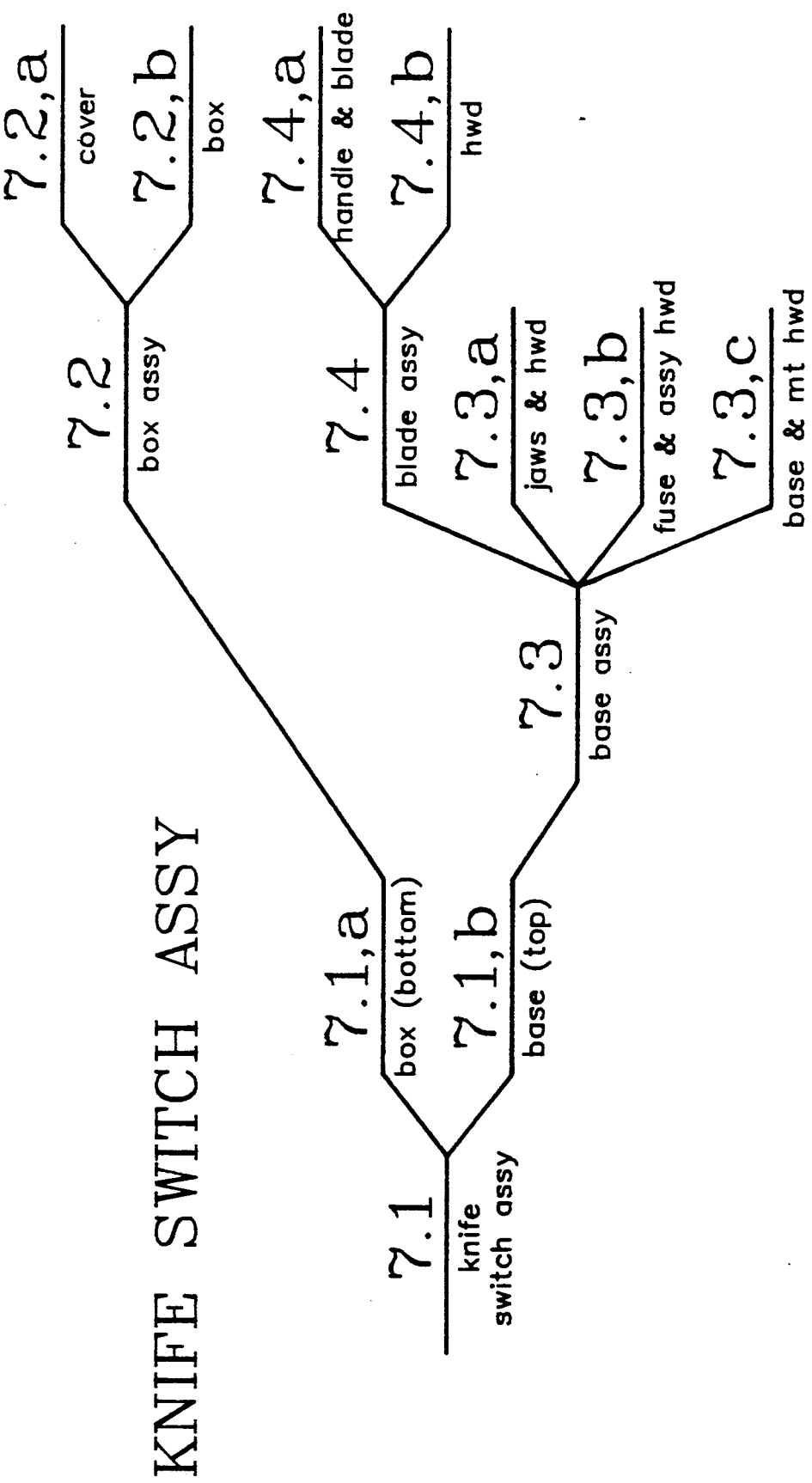

In FIGS. 3A-3B there is shown a tree diagram that illustrates the hierarchical organization of the assemblies, subassemblies and parts for a transit car. The illustrated portion of the tree diagram represents a narrowing and broadening a knife switch assembly depending on the direction of movement within the tree.

In FIGS. 3C-3F there is shown an exemplary hierarchical sequence of graphics associated with a knife switch assembly. These graphics are representative of a set of graphics that is resident on a laser video disk 15 for retrieval by a laser disk drive and control 16. The blade assembly is the lowest level of the hierarchy. The box assembly and the base assembly are different assemblies at the same level. See the text for knife switch assembly in the Appendix. In the Appendix, text data in the text files for the top car level and the knife switch, base, and blade assemblies are set forth, and they are representative of a total set of text files tied to the total set of graphics files and placed in a text file storage 18 in the EMS work station 10. Generally, each text file includes target coordinates, branching information, abbreviated part descriptive information and additional fields for additional data pointers. In addition, photographs of actual screen displayed graphics are included in the Appendix and they include a hierarchy from a top level car perspective to a bottom level exploded knife switch perspective.

Conventional computer controllable monitors having quality resolution may be employed as the screens 12 and 14. For example, Sony high resolution monitors may be employed.

The laser video disk 15 stores a large volume of graphic information. Generally, the graphic illustrations for the various levels of the product structure are appropriately prepared for recording on the laser disk. Each graphic is stored at a particular frame, i.e., file, location on the disk. Frame, i.e., file, indexing to the graphics thus provides the basis for system access to particular graphics to be displayed on the graphics screen 14. A similar process is employed for storing video sequences employed in the job aids subsystem 30.

Figure 1B:
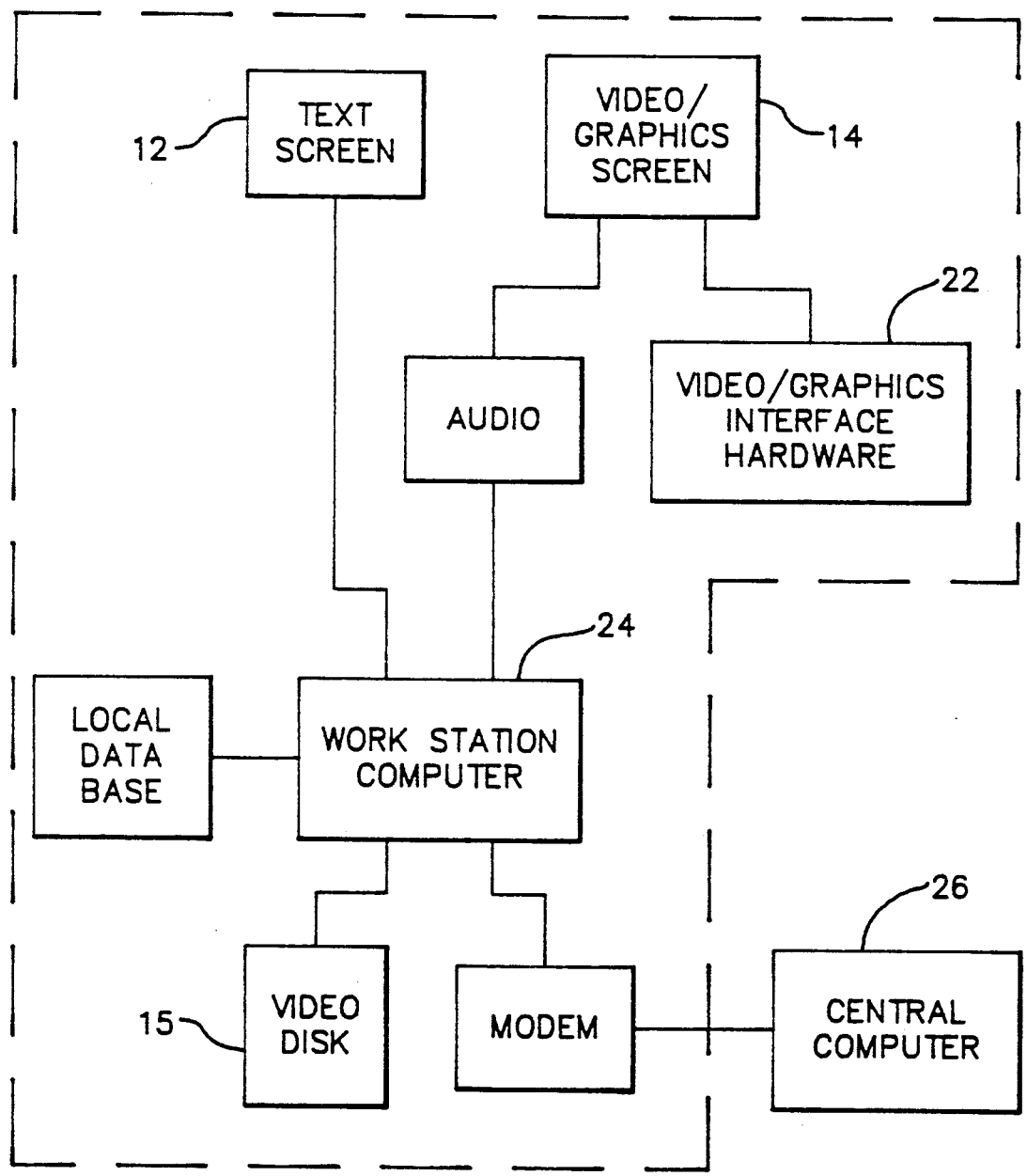
FIG. 1B shows a hardware block diagram for the EMS work station.

As shown in FIG. 1B, work station operation is controlled by one or more digital computers 24 (preferably one, such as a conventional IBM PC or AT). The computer 24 is programmed to perform various functions shown in FIG. 1 and to interface with other hardware in controlling the operation of the EMS work station. The computer 24 accordingly interfaces with operator controls including an alphanumeric input device such as a keyboard 20 or a bar code reader (not shown), the graphics screen 14 through video/graphics hardware 22, the text screen through the video display interface hardware 22 which in some cases may be conventional or in other cases may be modified as indicated in the patent application identified below, a central computer 26 (FIG. 1A) for communications, order entry, and the order entry functions described below, and input selector devices such as interfacing employed for screen pad selectors, interfacing for a mouse selector, etc. according to the particular selector scheme employed in the work station.

One of the basic functions of the EMS work station is the identification of needed parts. Generally, if the part number is known, the user may enter the supplier's part number or the customer's stock number through the keyboard 20 and the work station 10 displays text and graphic information on the screens 12 and 14 pertaining to the known part or subassembly.

If the part number is not known, the user can use a select device 30 such as a light pen, an electronic mouse or a touch screen to page through the hierarchically organized graphics for the product from the top level assembly downward until the needed part is identified.

With reference again to FIG. 1A, another basic function of the EMS work station 10 can be used once a desired part or subassembly has been identified by the user. Thus, a parts procurement subsystem 28 can be employed to write an order for the part in the user's work station computer 24 and transmit it to the central computer 26. The procurement subsystem provides data structured in a highly useful and efficient format and sequence to facilitate management and maintenance decision making. Preferably, point-of-purchase (POP) marketing considerations are employed in the structuring and sequencing of the data.

Another basic feature of the EMS work station 10 enables assembly job aids to be provided to the user with appropriate access and sequencing. Accordingly, an assembly job aids subsystem 30 employs text displays on the screen 12 and audio and graphic displays or video sequences on the graphics screen 14 to provide step-by-step instructions on maintenance and repair, training and/or quality assurance and control procedures.

OPERATION OF THE EMS WORK STATION

Figure 2A:
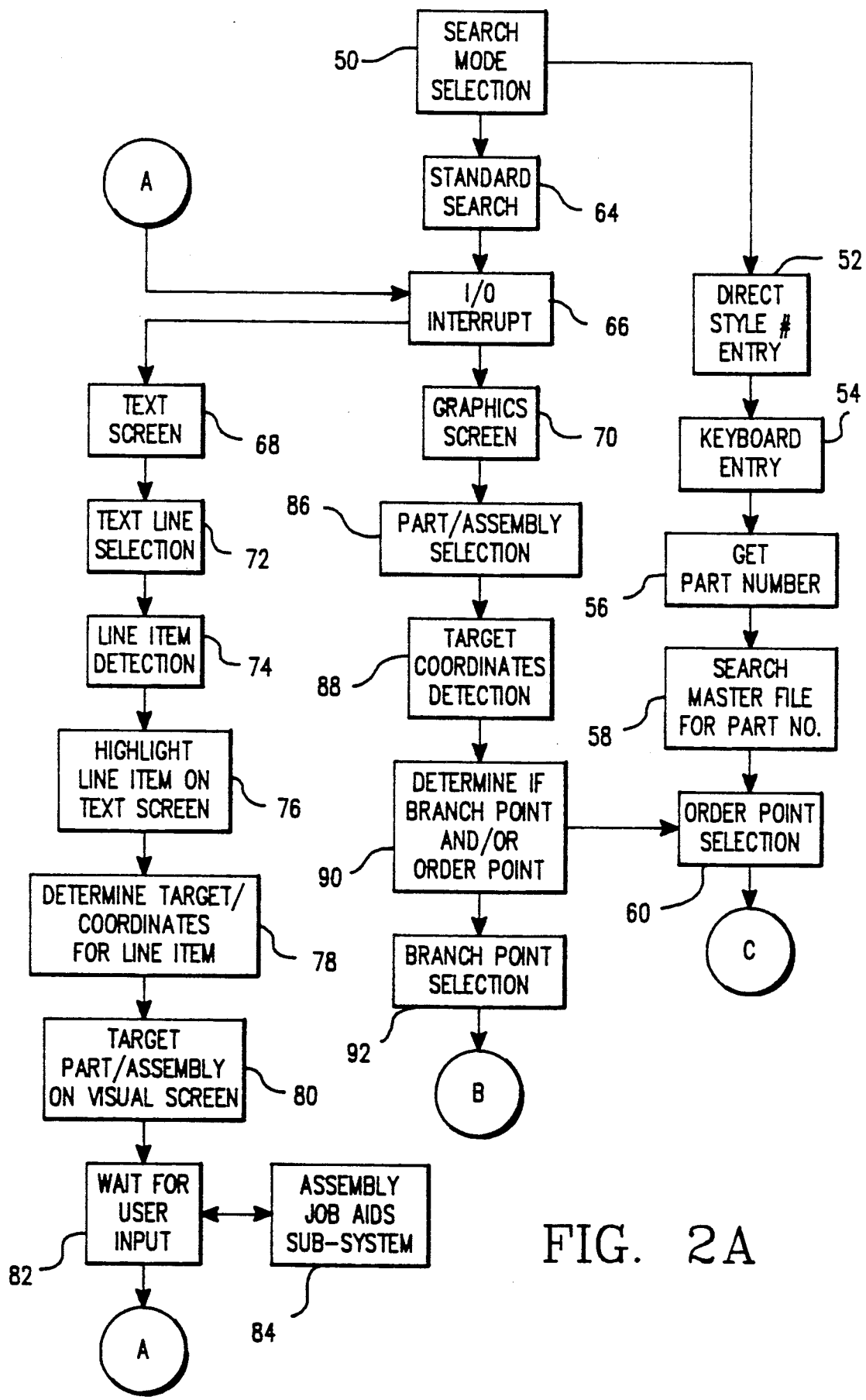
FIGS. 2A–2C show flow diagrams for programming employed in operating the EMS work station of FIG. 1.
Figure 2B:
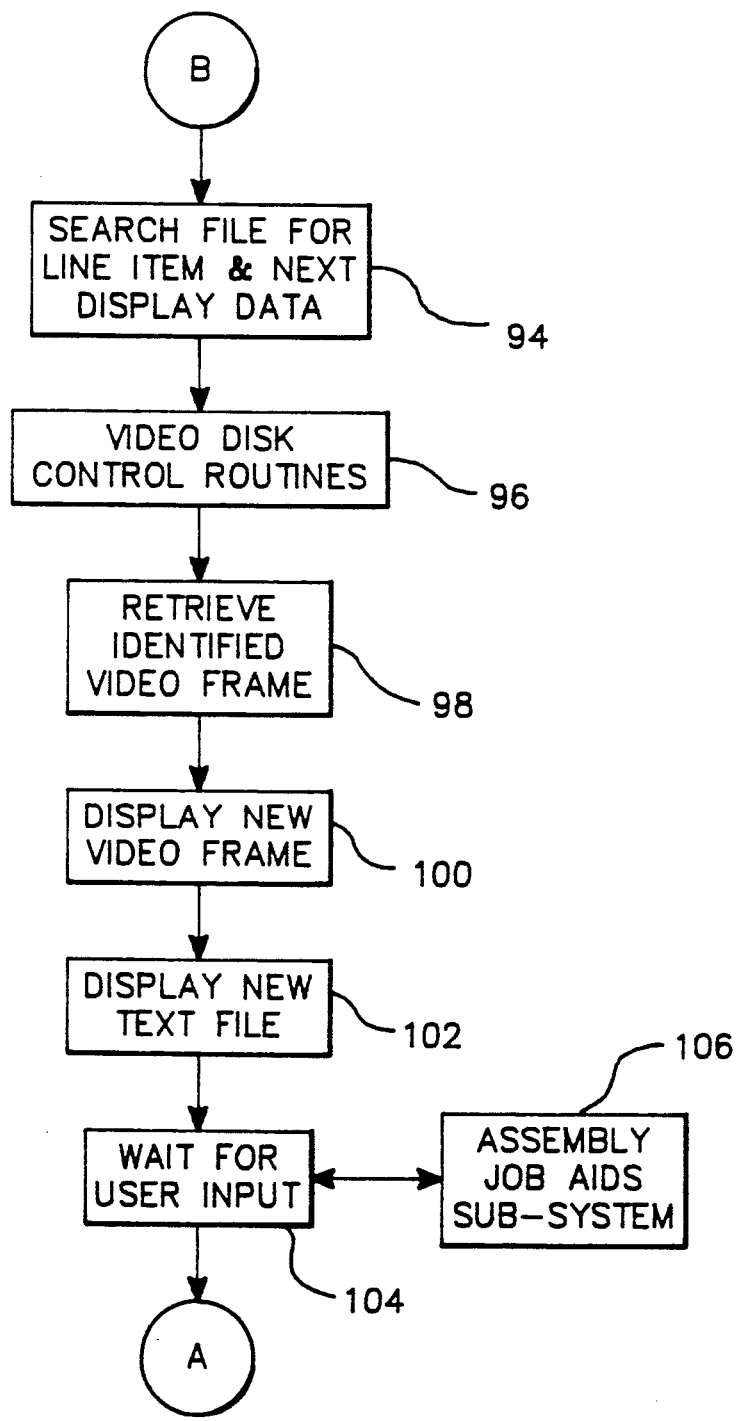
Figure 2C:
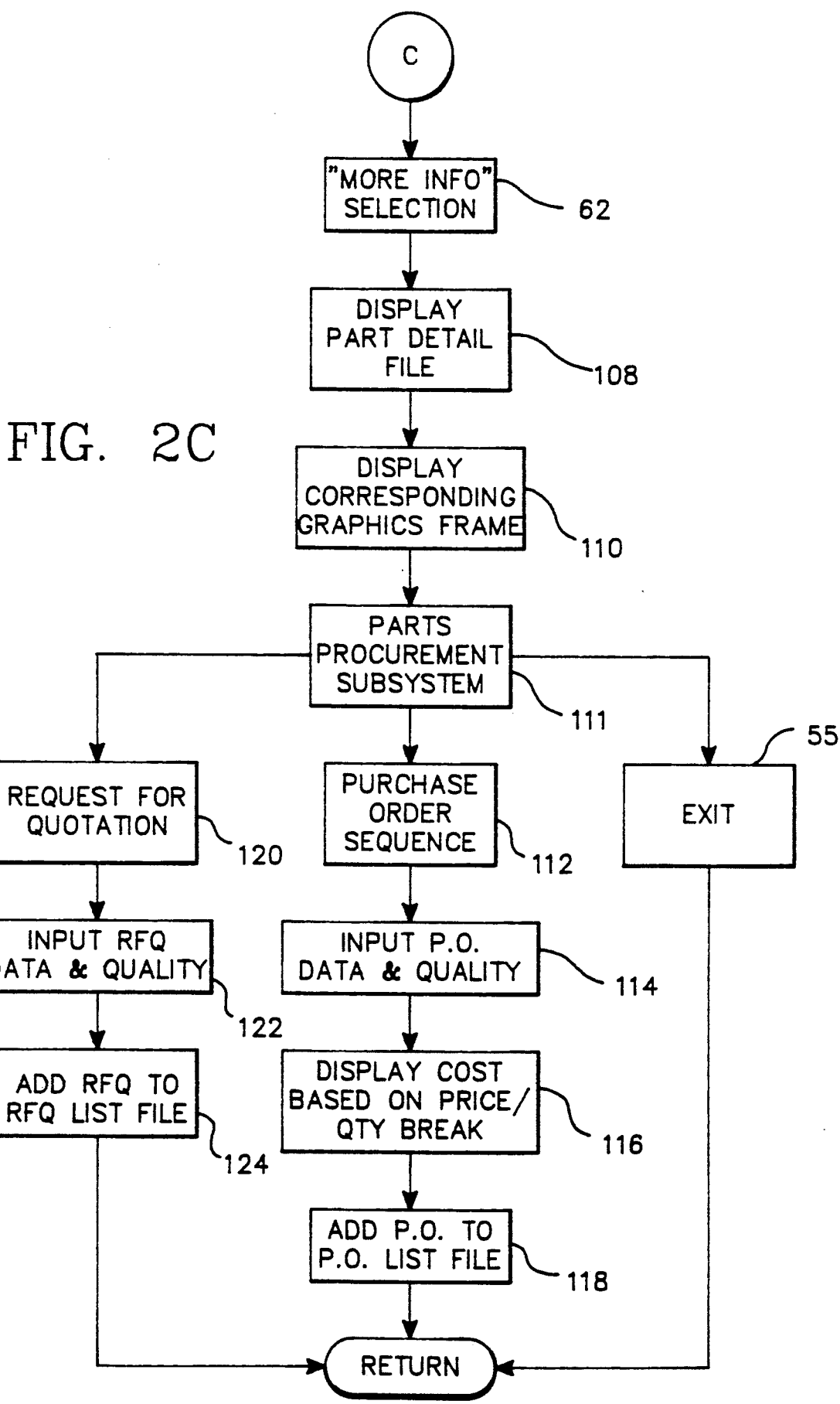

The EMS work station 10 is operated and controlled by the computer 24 under the direction of programming illustrated by flow charts in FIGS. 2A-2C. Once the system is energized, the user enters the system by selecting in block 50 the mode of search to be employed for a part or subassembly.

If direct entry is chosen as indicated by block 52, the keyboard 20 (FIG. 1A) is used to enter the supplier's part number or customer's stock number as indicated by blocks 54 and 56. A routine in the graphics/keyboard monitor program 32 (FIG. 1A) then searches the part files 37 for the entered part number as indicated by block 58. If a customer stock number has been entered, cross indexing is first used to identify the part number.

Once the part record is found for the entered part number, i.e., file, a frame number for a corresponding graphic is obtained from the part record and the part record data is displayed on the text screen 12 and the graphic is displayed on the graphics screen 14. The video disk drive and control 16 (FIG. 1A) is operated to find the identified disk frame on the laser video disk 15 and retrieve the graphic for display on the graphics screen 14 through the interface hardware 22 and graphics display 23. Part record data is displayed on the text screen 12 through display text block 33.

The graphics monitor program 32 which displays the part file and the parts procurement subsystem 28 is placed in operation. Further detail on the part detail files and parts procurement will be presented subsequently herein.

When a standard search has been selected by the user as indicated by block 64 in FIG. 2A, the system generally operates under user control to scroll through the hierarchical data structure for the various assemblies, subassemblies and parts until the number for the needed part(s) is identified by the user. Generally, scrolling through the hierarchical data results in assembly explosion or breakdown as the search is narrowed to the particular subassembly or part that is needed.

Figure 3D:
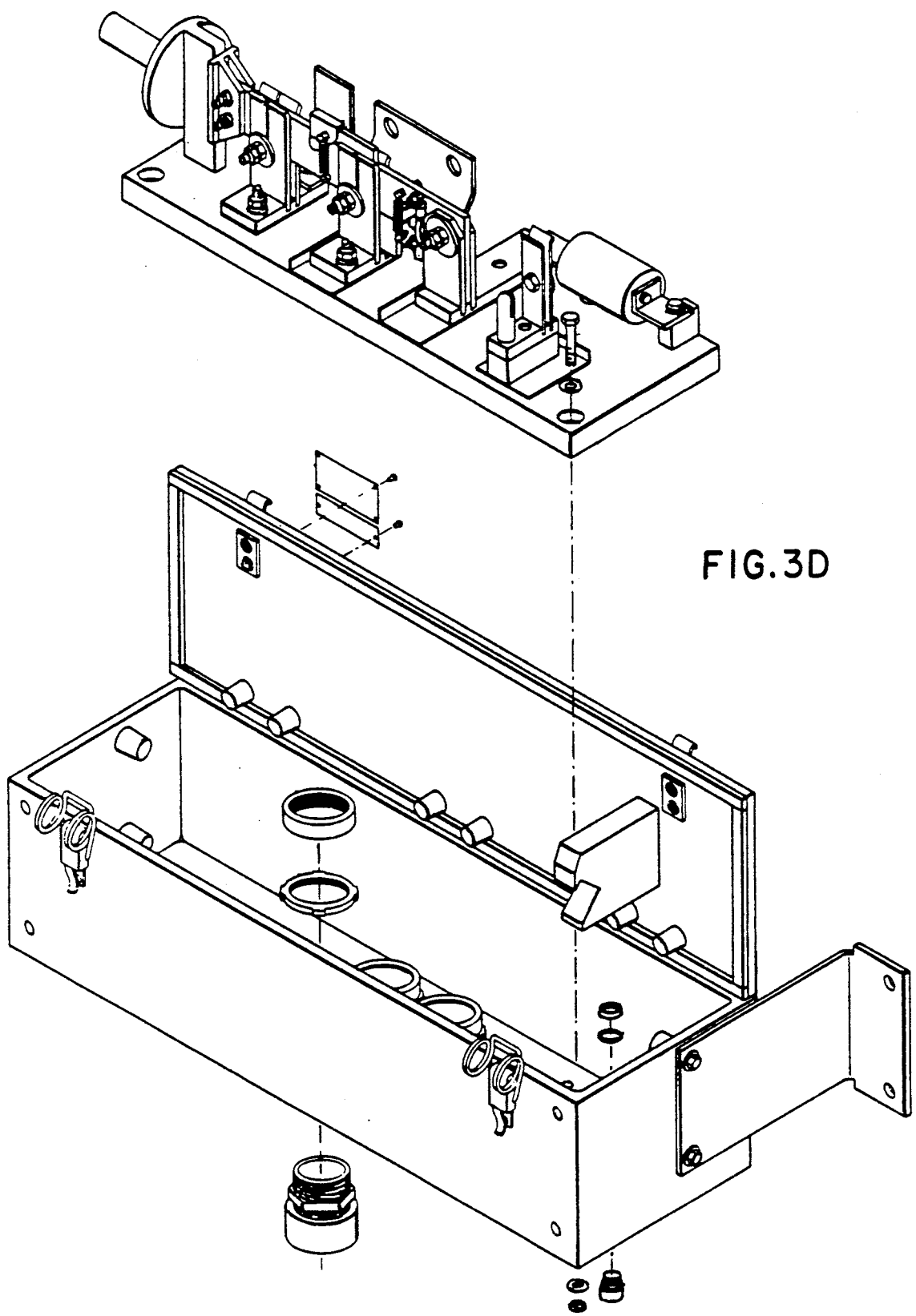
Figure 3E:
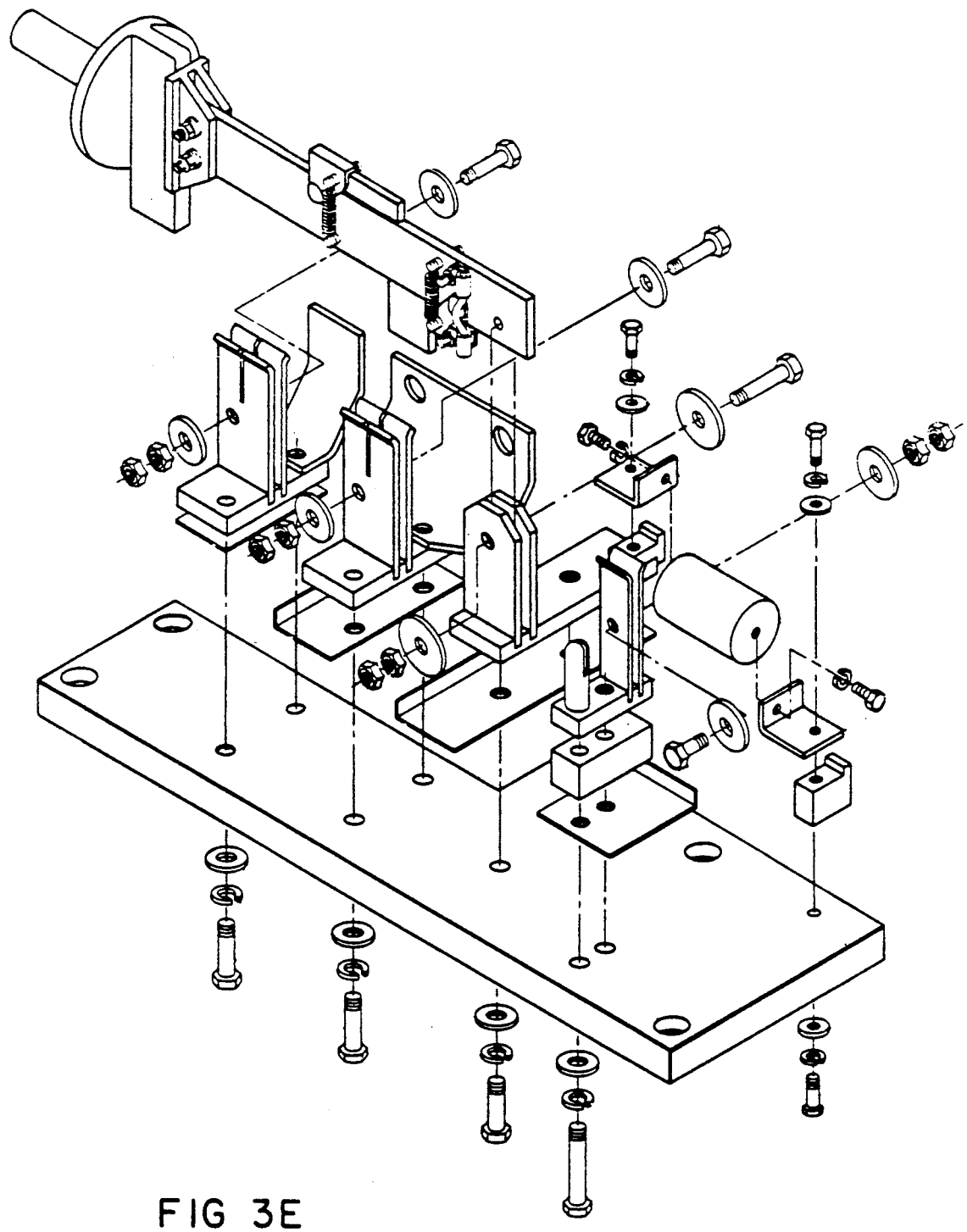
Figure 3F:
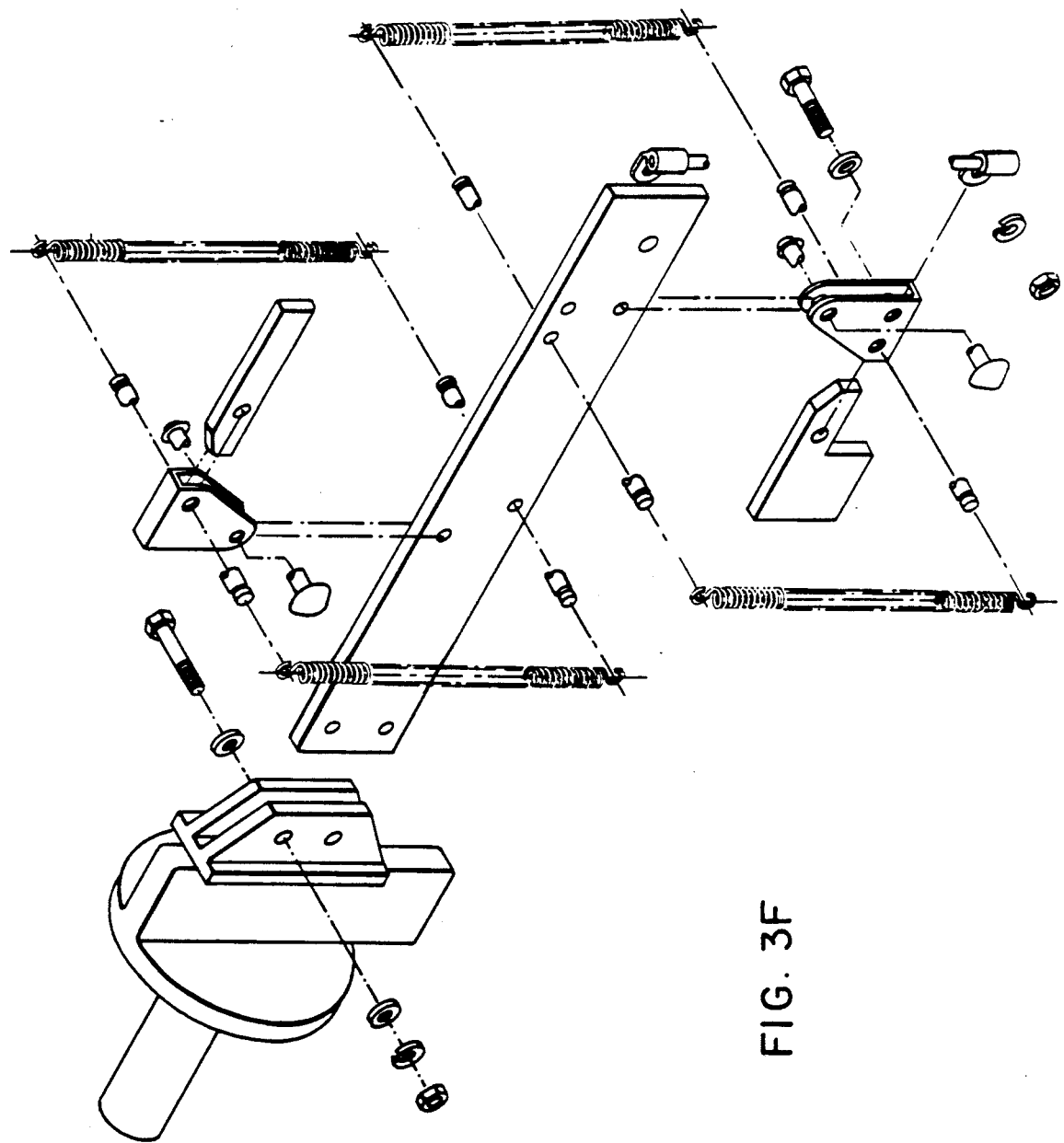

Hierarchical branching is achieved by pointing at the graphic screen 14 with the select device 30 to select an area of a displayed graphic to be enlarged, i.e., exploded as successively indicated in FIGS. 3D to 3F, through call-up of the next lower level graphic for that area. Operation of the select device 30 results in generation of an interrupt as indicated by block 66 and the monitor program 32 (FIG. 1A), including its graphics screen sequence 70, is executed in response to this input.

If the text screen 12 is activated by the selector 39, an interrupt is generated and a text screen sequence 68 of programmed steps is executed to highlight the activated text and to identify the highlighted text item on the graphics screen 14.

Reference is made to a copending patent application, Ser. No. 06/906,801, now U.S. Pat. No. 4,884,068 entitled "Multiple Display System", and filed by S. Matheny and G. Orwig, for disclosure of an intelligent light pen usable with appropriate software to function both as a text selector on the screen 12 and as a selector on the screen 14. Other light pens and other input/output devices such as an electronic mouse or touch pads can be employed in implementing the invention.

In the text screen sequence 68, a text field, and in this case a text line, is selected in block 72 by use of the text selector device 39 (i.e. the device is touched against the selected text) and thereafter the input signals to the computer identify the text location and thereby enable the selected line item to be identified in flow chart block 74. Block 76 then highlights the selected text and blocks 78 and 80 determine the x,y coordinates of the selected line item on the graphics screen 14 and generates an overlay indicator, in this case a line, that preferably encloses the selected item, or items if multiple units of the same item exist in the graphic, on the graphic display screen 14 and accordingly identifies clearly what the item is that has been selected on the text screen 12. Further, descriptive information on the text screen 12 can be readily correlated to the identified item and related items on the graphics screen 14.

As shown in corresponding parts of the functional block diagram of FIG. 1A, a text screen line detector 40 responds to the line selector signals to call for line highlighting by block 41 and for graphics targeting through target program 42. The text files 18 are checked by the target program 42 to identify the target coordinates in box 43. An overlay is defined by the coordinates to enclose and thereby identify the selected item on the graphics screen 14. Video interface hardware 22 and a conventional overlay display software package 25 operate to produce the target indicator at the defined location on the graphics screen 14.

Generally, enough coordinate points are identified to enable an identifier or overlay, and preferably an identifier overlay enclosure line, to be displayed around the item on the graphic display. In this case, two coordinate points are stored in the text file 18 for each line item, and for each unit of the line item in the graphic, in correspondence to the location(s) of the item in the graphic. The two points define opposite corners of a rectangle so that a rectangular overlay enclosure is specified in size and location to form a target enclosure about the text screen selected item on the graphics screen 14.

Once the item selected on the text screen 12 has been identified on the graphics screen 14, block 82 generates a wait for the next user input from the text screen 12 or graphics screen 14. At this point, the search can be continued or the assembly job aids subsystem 30 (FIG. 1A) or other subsystems can be called into operation as indicated by flow chart block 84. One of the pad selectors 34 appears on the text screen 12 when a job aids selection is made available.

In the graphics screen sequence 70, the selector 30 activates an area of the graphic screen where there is located a part or subassembly that the user desires to explode into greater detail. The resultant item selection is recorded by flow chart block 86 and the x,y coordinates for the selected item are detected in block 88 (see corresponding functional block 44 in FIG. 1A). If the detected coordinates do not correspond to a valid selected part, as determined by a search of valid coordinate data, all targets on the graphics screen are highlighted to indicate to the user that those parts may be selected.

Information is retrieved for the corresponding text line from the text files 18 at flow chart block 90 to determine whether the selected item is a branch point or an order point. A branch point is a point at which the displayed graphic can be further exploded into lower level subassemblies and/or parts. An order point is a point at which the user has an option to place an order for an assembly, subassembly, or part visible in the graphic display and possibly part of a kit which may include items in other graphics.

In the case of a detected branch point, block 94 (FIG. 2B) provides for the use of a field of the current text file 18 to determine the text file at the next lower level for the text line item corresponding to the detected coordinates on graphics monitor screen 14.

The next text file is then searched in block 96 to determine the video disk frame number for the corresponding graphic, and video disk control routines are executed to operate the disk drive and, in block 98, to retrieve the graphic from the identified disk frame, i.e., file. Block 100 displays the retrieved frame on the graphic screen 14 and block 102 puts the corresponding text file on the text screen 12 for simultaneous display.

As previously described for the text screen sequence, the graphics screen sequence next waits in block 104 for the next user input (I/O interrupt) from the text screen 12 or the graphic screen 14. The search thus may be continued or, again, the assembly job aids subsystem 30 may be selected for operation as indicated by block 106.

The user can scroll backwards to higher level assemblies. The back selection is made by touching a "Back" touch screen pad included as a pad selector 34A for the graphics screen 14.

The standard search can be continued through branching until an order point is reached. An order point may be a termination point in the hierarchy or it may be a higher level point at which part procurement can be initiated and/or additional branch searching can be continued.

At an order point as detected by block 90, more information is selected in flow chart block 62 through use of a pad selector 34 which is detected by block 35 (FIG. 1A). As a result, a part detail file is called up by flow chart block 108 from functional block 37 to provide important information related to making a purchase decision. The corresponding graphic frame is simultaneously shown on the graphics screen 14. The relevance of the content of the part detail file and its presentation at the point of purchase greatly facilitates management of the use and maintenance of the products serviced by the EMS work station 10.

The preferred data structure for the part detail screen is provided in the Appendix. An order point text screen is also included to show the More Info touch pad for calling up the part detail file.

The part detail file has point of purchase marketing significance. Thus, detailed and/or extended part information is provided to reinforce confidence that a correct part identification has been made. Further, stock availability and lead time are provided to influence the timing of the placement of part orders thereby facilitating the management of the use and maintenance of the product and enhancing supplier/purchaser relationships. With the provision of logistic engineering data summaries such as failure rate and confidence levels, better purchase decisions can be made on the basis of actual experience with the particular part. The confidence level refers to the probability of a system failure if a part failure occurs with the indicated number of spares are kept in inventory.

In addition, any applicable quality statements regarding built-in quality can be set forth in the part detail file so that the user has parts product information of importance in making a decision among parts from competing suppliers.

Pricing information is also included in the part detail file. Preferably, the price data display is dynamic in the sense that quantity price breaks are shown as applicable to assist the user in deciding how many units of the identified part are to be ordered. As shown in the Appendix, the unit price for an ordered quantity is shown along with the unit price for the next lower price break point and the next higher price break point.

Where-used information provides the quantity of parts used in the serviced product, the subassemblies in which it is used, and the top level assemblies in which it is used. The supplier's part number is also shown along with the corresponding customer's stock number and a description of the part. Stock availability information includes lead time and stocks on hand. The stock-on-hand record can be the supplier's inventory or the user's inventory or it can be both, with the user making a selection of the inventory record to be displayed.

The part detail screen in this illustrative embodiment includes three selection pads 34 as shown in the Appendix. These pads provide the user with a menu for branching to the parts procurement subsystem 28. As shown in FIG. 1A, respective detectors 45, 46 and 47 determine when any of the selections has been made by the user. Blocks 48 and 49 respectively provide for purchase order data input and request for quote (RFQ) input. All purchase orders and RFQ's are listed in permanent files as shown.

In the purchase order sequence 112 (FIG. 2C), block 114 prompts the user to enter the item number and the purchase order number on the part detail screen and a general order number is then generated. The quantity to be ordered is next requested and block 118 displays and highlights the quantity and the price with the next lower and higher price breaks displayed as previously described. Block 118 adds the purchase order (PO) to the stored PO list and transmits the order to the supplier's host computer for processing after the quantity and customer stock numbers are confirmed.

The RFQ sequence 120 is entered if the user initially selects it or if the user has selected the PO sequence 112 and pricing information for the desired part is not available in the data base. In the latter case, the unavailability of price information is communicated to the user and a switchover is made to the RFQ sequence.

Once the RFQ sequence has been entered, an RFQ part detail screen is displayed as shown in the Appendix. As previously considered, relevant part information is displayed. Block 122 prompts the user for the RFQ number, the item number and the quantity required. The RFQ is added to the RFQ list in block 124 and it is transmitted to the supplier's computer for a price quotation.

After either the end of the PO or the RFQ sequence, the user is prompted to check whether the record customer stock number is correct. If it is not, an updated number is entered. This feature provides a convenient update scheme for stock numbers which may change from time to time.

Price security is supported by the system operation as described. A PO or RFQ sequence is the only way in which the EMS work station 10 can be operated to display price data. Once the user initiates a PO or RFQ sequence, the sequence must be completed and data related to the sequence execution is stored in the PO list or RFQ list. Thus, legitimate customer price inquiries are facilitated while improper price fishing expeditions are discouraged.

The system also provides the user with the option to check and request training and assembly job aids at various levels of the hierarchial structure as previously indicated or from a user selectable menu of training options. The computer aided training and job aids subsystem 30 incorporates the use of the video, audio and text displays of the interactive video disk system to provide maintenance personnel with step-by-step instructions in the proper disassembly, replacement, assembly and testing of the part(s) and/or subassembly, in addition to special test requirements and quality assurance and control procedures.

The system first makes a request for the kind of training desired. If maintenance and repair training is selected, the graphic and text information is displayed to identify subassembly requirements. The system then checks special/appropriate assembly procedures and further checks special tooling requirements. Next, the system tests to determine whether quality control training or aids are required. If so, the system displays training aids to assist in checking assembly procedures to ensure that the part is assembled to specification. It also checks any torquing and clearance requirements and special test requirements. The system steps the user through quality assurance and control procedures to ensure that all the quality control specifications are met.

APPENDIX

| Style No. | Stock No. | Description | Qt. |
|---|---|---|---|

TOP LEVEL - CAR

-continued

APPENDIX

| | | | |
|---|---|---|---|
| 1111111111 | R01-4444444 | PROPULSION SYSTEM RENEWAL PARTS DATA-MIAMI-ROTATING APPARATUS | 1 |
| 332P820G01 | | 1462-DA MOTOR ASSEMBLY | 4 |
| 332P806G01 | | WR-501-6 TRACTION GEAR UNIT | 4 |
| 1507F83G01 | | XCD-398B MOTOR CONTROL BOX ASSEMBLY | 1 |
| 2267D06G01 | | TE-359B CONVERTER ASSEMBLY | 1 |
| 2266D26G01 | | UPB-55H LINE SWITCH BOX ASSEMBLY | 1 |
| 2266D78G01 | | TE-330 SEMI-CONDUCTOR BOX ASSEMBLY | 1 |
| 1117F67G04 | | TX-239A TRUCK DISCONNECT BOX | 4 |
| 2266D33G01 | | TK 34-Y KNIFE SWITCH ASSEMBLY | 1 |
| 1504F17G01 | | FS-81A MOTOR REACTOR ASSEMBLY | 1 |
| 4682C93G01 | | LINE REACTOR ASSEMBLY | 1 |
| 1507F93G02 | | MA-20 BRAKING RESISTOR (25 TUBES) | 1 |
| 1507F93G01 | | MA-20 BRAKING RESISTOR (20 TUBES) | 1 |
| 2266D17G02 | | WM & TM RESISTOR ASSEMBLY | 1 |
| 1508F98G02 | | OPERATOR CONTROLS | 1 |
| 4680C53G01 | | SEMICONDUCTOR BLOWER & FILTER ASSEMBLY | 1 |
| 1508F25G01 | | PROPULSION AIR DUCT ASSEMBLY | 1 |
| 2266D82G03 | | ELECTRONIC LOCKER ASSEMBLY B CAR | 1 |
| 2269D14G01 | | PROGRAM STOP SYSTEM INSTALLATION | 8 |
| 2267D85G01 | | WAYSIDE TERMINATION BOX | 80 |
| 2268D09G02 | | ANTENNA INSTALLATION PROGRAM STATION STOP | 1 |

TOP ASSEMBLY LEVEL

| | | |
|---|---|---|
| 2266D33G01 | Knife Switch Assebbly, Type TK 34-Y | 1 |
| 8363D85G02 | Base Assembly | 1 |
| 2266D32G01 | Box Assembly | 1 |
| 184P283H01 | Nameplate | 1 |
| 184P281H01 | Nameplate | 1 |
| 3926A97H05 | Bushing, Insulating (1.50) | 3 |
| 3926A97H01 | Bushing, Insulating (.50) | 1 |
| 4771A91H23 | Grip, Cable 1.00-1.13 | 3 |
| 4771A91H13 | Grip, Cable .375-.437 | 1 |
| 70220CAN3A | Locknut, 1.500 Conduit | 3 |
| 70220CAN3G | Locknut, .500 Conduit | 1 |
| 70100EG04U | Bolt, .312-18 × 1.75 Lg Hex Hd Stl | 4 |
| 70500CT00T | Flatwasher, .312 Std Stl | 8 |
| 70510DL10P | Lockwasher, .312 X-Hvy Duty Stl | 4 |
| 70210BK618 | Nut, .312-18 Hex Stl | 4 |
| 70012APH1Q | Screw, Drive, .112 × .19 Lg Rd Hd Set | 6 |
| 53314NX00A | Adhesive (Loctite No. 404) | A/R |
| 45793BX00A | Compound, Silicone Rubber (RTV #732) | A/R |

KNIFE SWITCH - BASE ASSEMBLY

| | | |
|---|---|---|
| 8363D85G02 | Base Assembly | 1 |
| 3970C59H01 | Base | 1 |
| 226D332G04 | Blade Assembly | 1 |
| 8363D83G01 | Jaw, Hinge | 1 |
| 4768A99H43 | Fuse, 350 Amp 1400 Volt | 1 |
| 226D333G03 | Jaw, Text | 1 |
| 8363D83G02 | Jaw, Break | 1 |
| 8363D83G03 | Jaw, Break | 1 |
| 3436C82H05 | Block, Mounting | 1 |
| 177A331H03 | Spacer | 1 |
| 6244D11H05 | Spacer | 2 |
| 6244D11H12 | Barrier | 1 |
| 6244D11H13 | Barrier | 1 |
| 6244D11H09 | Barrier | 1 |
| 55212CJ00A | Grease | 0 |
| 70100EG04R | Bolt, .312-18 × 1.38 Lg Hex Hd Stl | 2 |
| 57D0604H22 | Cupwasher, .328 ID × 1.125 OD | 6 |

KNIFE SWITCH - BLADE ASSEMBLY

| | | |
|---|---|---|
| 226D332G04 | Blade Assembly | 1 |
| 4227B50H01 | Guide, Quick Brake | 2 |
| 8617A10H01 | Blade, Quick Brake | 1 |
| 4227B53H01 | Blade, Quick Brake | 1 |
| 226D332H15 | Blade | 1 |
| 2540B31G01 | Shunt | 1 |
| 4677C10H01 | Handle | 1 |
| 0855927H07 | Spring | 4 |
| 8617A05H01 | Pin, Spring | 4 |
| 70400CA44L | Rivet, .250 × .50 Rd Hd Copper NF | 2 |
| 70100EG01R | Boly, .250-20 × .88 Lg Hex Hd Stl | 2 |
| 70100EG01W | Bolt, .250-20 × 1.25 Lg Hex Hd Stl | 2 |
| 70500BD30F | Flatwasher, .250 Std StLl | 6 |
| 70510CV10M | Lockwasher, .250 Reg Stl | 2 |
| 70510DL10M | Lockwasher, .250 Hvy Stl | 2 |
| 70210BK616 | Nut, .250-20 Hex Stl | 4 |

PART DETAIL SCREEN

| Effect Date | Part/Stock | Description | Order Qty | Price/ea. | Extended |
|---|---|---|---|---|---|
| 860226 | 0855927H07 | Spring | 40 | 10.00 | |

APPENDIX -continued

| | | | | | 80 | 7.00 |
|---|---|---|---|---|---|---|
| R01-1211111 | | | | | 400 | 4.00 |

Failure Rate/Million Hours of Operation  63.25
Calculations Indicate the
Following for Confidence Levels of:   90%   80%   60%
Number of Spares Required:   100   50   25

| | Lead-Time | Loc | Onhand | Ship Date | Pur. order | Item | G.O. No (JJ) |
|---|---|---|---|---|---|---|---|
| 860226 | 20 Days | | | | | | |
| | Stock | | | | | | |

Vendor:                                    Cat. No:
Quality Notes:

| | Where Used | | Qty | Fig. No |
|---|---|---|---|---|
| KNIFE SWITCH | | | 4 | 7.4 |

Quantity Per Car set 4

Touch One:   Request for Quotation   Place Purchase Order   Return

TEXT SCREEN - ORDER POINT

| | | | |
|---|---|---|---|
| 4227B50H01 | | Guide, Quick Brake | 2 |
| 4227B53H01 | | Blade, Quick Brake | 1 |
| 226D332H15 | | Blade | 1 |
| 2540B31G01 | | Shunt | 1 |
| 0855927H017 | R01-1211111 | Spring | 4 |
| 8617A05H01 | | Pin, Spring | 4 |
| 70400CA44L | | Rivet, .250 × .50 Rd Hd Copoper NF | 2 |
| 70100EG01R | | Bolt, .250–20 × .88 Lg Hex Hd Stl | 2 |
| 70500BD30F | | Flatwasher, .250 Std Stl | 6 |
| 70510CV10M | | Lockwasher, .250 Reg Stl | 2 |
| 70210BK616 | | Nut, .250–20 Hex Stl | 4 |

Press the light pen here for further information on this item.
More Info.

---

What is claimed is:

1. An electronic maintenance support (EMS) work station comprising:

a first monitor screen for displaying text information related to a product having a plurality of parts, subassemblies, and assemblies;

a second monitor screen for displaying graphic illustrations of the assemblies, subassemblies, and parts of the product;

means for storing a plurality of text files, each text file containing predetermined data associated with an assembly, subassembly, or part of the product, the text files being arranged in an hierarchical organization of parts, subassemblies, and assemblies of the product;

means for storing a plurality of graphics, each graphic containing an illustration of an assembly, subassembly, or part within the hierarchical organization;

means for storing coordinate data defining areas overlying at least one portion of at least some of the graphics which may be selected for display of assemblies, subassemblies, and parts in the hierarchical organization;

means for linking each text file with a corresponding graphic;

means for selecting text files relative to said first monitor screen;

means for selecting one of the areas overlying a portion of a graphic relative to said second monitor screen for displaying a different graphic in the hierarchical organization;

means for detecting each of the text files or areas of the graphics selected by said means for selecting and for controlling said means for storing to retrieve each of the selected text files or graphics and the graphic or text file linked to each of the selected text files or graphics, respectively, by said means for linking;

means for displaying on said screens each of the text files or graphics selected by said means for selecting and the graphic or text file linked to each of the selected text files or graphics, thereby enabling searching through the hierarchical organization for an assembly, subassembly, or part needed for maintenance purposes wherein said means for controlling responds to said means for selecting text to identify selected text; and means for graphically indicating on said second monitor screen the assembly, subassembly, or part corresponding to the selected text.

2. An EMS work station as set forth in claim 1 wherein said means for graphically indicating includes:

means for linking the stored coordinate data with the selected text corresponding to an assembly, subassembly, or part and generating, for the selected text, an indicator line enclosing and identifying the assembly, subassembly, or part on said second monitor screen corresponding to the selected text.

3. An EMS work station as set forth in claim 2 wherein the indicator line is a rectangle.

4. An EMS work station as set forth in claim 1 including means for highlighting the selected text on said first monitor screen.

5. An EMS work station as set forth in claim 1 including means for storing text information and graphics concerning assembly of a product and means for detecting a selection of text information and graphics concerning assembly of a product made by said means for selecting and for retrieving from said means for storing information text information concerning assembly of a product and graphics for display on said first and second monitor screens, respectively.

6. An EMS work station as set forth in claim 1 wherein said means for storing a plurality of graphics is a laser videodisc.

7. An EMS work station as set forth in claim 6 wherein said laser videodisc includes frame numbers defining the locations of the graphics on said laser videodisc and wherein said means for linking employs the frame numbers for linking graphics and text files.

8. An Ems work station as set forth in claim 1 including means for entering a known part identification number to display corresponding text file and graphic.

9. An electronic maintenance support (EMS) work station comprising:

a first monitor screen for displaying text information related to a product having a plurality of parts, subassemblies, and assemblies;

a second monitor screen for displaying graphic illustrations of the assemblies, subassemblies, and parts of the product;

means for storing a plurality of text files, each text file containing predetermined data associated with an assembly, subassembly, or part of the product, the text files being arranged in an hierarchical organization of parts, subassemblies, and assemblies of the product;

means for storing a plurality of graphics, each graphic containing an illustration of an assembly, subassembly, or part within the hierarchical organization;

means for storing coordinate data defining areas overlying at least one portion of at least some of the graphics which may be selected for display of assemblies, subassemblies, and parts in the hierarchical organization;

means for linking each text file with a corresponding graphic;

means for selecting text files relative to said first monitor screen;

means for selecting one of the areas overlying a portion of a graphic relative to said second monitor screen for displaying a different graphic in the hierarchical organization;

means for detecting each of the text files or areas of the graphics selected by said means for selecting and for controlling said means for storing to retrieve each of the selected text files or graphics and the graphic or text file linked to each of the selected text files or graphics, respectively, by said means for linking;

means for displaying on said screens each of the text files or graphics selected by said means for selecting and the graphic or text file linked to each of the selected text files or graphics, thereby enabling searching through the hierarchical organization for an assembly, subassembly, or part needed for maintenance purposes wherein said means for controlling responds to said means for selecting text to identify selected text;

means for graphically indicating on said second monitor screen the assembly, subassembly, or part corresponding to the selected text;

means for placing orders to purchase an assembly, subassembly, or part identified by a user from at least one of said screens; and means for selecting said means for placing orders wherein said means for displaying displays on said first monitor screen the predetermined data associated with the identified assembly, subassembly, or part.

10. An EMS work station as set forth in claim 9 including central computer means and means for transmitting to said central computer means entries made through said means for placing order to purchase.

11. An electronic maintenance support (EMS) work station comprising:

a first monitor screen for displaying text information related to a product having a plurality of parts, subassemblies, and assemblies;

a second monitor screen for displaying graphic illustrations of the assemblies, subassemblies, and parts of the product;

means for storing a plurality of text files, each text file containing predetermined data associated with an assembly, subassembly, or part of the product, the text files being arranged in an hierarchical organization of parts, subassemblies, and assemblies of the product;

means for storing a plurality of graphics, each graphic containing an illustration of an assembly, subassembly, or part within the hierarchical organization;

means for storing coordinate data defining areas overlying at least one portion of at least some of the graphics which may be selected for display of assemblies, subassemblies, and parts in the hierarchical organization;

means for linking each text file with a corresponding graphic;

means for selecting text files relative to said first monitor screen;

means for selecting one of the areas overlying a portion of a graphic relative to said second monitor screen for displaying a different graphic in the hierarchical organization;

means for detecting each of the text files or areas of the graphics selected by said means for selecting and for controlling said means for storing to retrieve each of the selected text files or graphics and the graphic or text file linked to each of the selected text files or graphics, respectively, by said means for linking;

means for displaying on said screens each of the text files or graphics selected by said means for selecting and the graphic or text file linked to each of the selected text files or graphics, thereby enabling the product structure to be searched through the hierarchical organization for an assembly, subassembly, or part needed for maintenance purposes;

means for placing orders to purchase an assembly, subassembly, or part identified by a user from at least one of said screens;

means for selecting said means for placing orders wherein said means for displaying displays on said first monitor screen the predetermined data associated with the identified assembly, subassembly, or part;

second selection means for selecting from said means for placing orders a purchase order sequence and a request for quotation sequence for displaying price information for ordering and for quoting the price of the identified assembly, subassembly, or part, respectively; and means for recording selections of price information for ordering and quoting, for keeping a history of work station access to price information.

12. An EMS work station as set forth in claim 11 wherein said means for displaying on said first monitor screen the predetermined data includes means for displaying predetermined logistic support information.

13. An EMS work station as set forth in claim 12 wherein the logistic support information includes failure rate data and confidence level data for spare availability relative to the number of spares on hand.

14. An EMS work station as set forth in claim 11 including third selection means for displaying a selected one of user and supplier inventory information.

15. An electronic maintenance support (EMS) work station comprising:
- a first monitor screen for displaying text information related to a product having a plurality of parts, subassemblies, and assemblies;
- a second monitor screen for displaying graphic illustrations of the assemblies, subassemblies, and parts of the product;
- means for storing a plurality of text files, each text file containing predetermined data associated with an assembly, subassembly, or part of the product, the text files being arranged in an hierarchical organization of parts, subassemblies, and assemblies of the product;
- means for storing a plurality of graphics, each graphic containing an illustration of an assembly, subassembly, or part within the hierarchical organization;
- means for storing coordinate data defining areas overlying at least one portion of at least some of the graphics which may be selected for display of assemblies, subassemblies, and parts in the hierarchical organization;
- means for linking each text file with a corresponding graphic;
- means for selecting text files relative to said first monitor screen;
- means for selecting one of the areas overlying a portion of a graphic relative to said second monitor screen for displaying a different graphic in the hierarchical organization;
- means for detecting each of the text files or areas of the graphics selected by said means for selecting and for controlling said means for storing to retrieve each of the selected text files or graphics and the graphic or text file linked to each of the selected text files or graphics, respectively, by said means for linking;
- means for displaying on said screens each of the text files or graphics selected by said means for selecting and the graphic or text file linked to each of the selected text files or graphics, thereby enabling searching through the hierarchical organization for an assembly, subassembly, or part needed for maintenance purposes;
- means for placing orders for an assembly, subassembly, or part identified by a user from at least one of said screens;
- means for selecting said means for placing orders wherein said means for displaying displays on said first monitor screen the predetermined data associated with the identified assembly, subassembly, or part;
- second selection means for selecting from said means for placing orders a purchase order sequence and a request for quotation sequence for displaying price information for ordering and for quoting the price of the identified assembly, subassembly, or part, respectively; and
- means for generating price information on the basis of an ordered or quote-requested quantity, said price information including the price resulting from the ordered or quote-requested quantity and the price of a larger or smaller quantity resulting in a different price per unit of the identified assembly, subassembly, or part.

16. An electronic maintenance support (EMS) work station comprising:
- a first monitor screen for displaying text information related to a product having a plurality of parts, subassemblies, and assemblies;
- a second monitor screen for displaying graphic illustrations of the assemblies, subassemblies, and parts of the product;
- means for storing a plurality of text files, each text file containing predetermined data associated with an assembly, subassembly, or part of the product, the text files being arranged in an hierarchical organization of parts, subassemblies, and assemblies of the product;
- means for storing a plurality of graphics, each graphic containing an illustration of an assembly, subassembly, or part within the hierarchical organization;
- means for storing coordinate data defining areas overlying at least one portion of at least some of the graphics which may be selected for display of assemblies, subassemblies, and parts in the hierarchical organization;
- means for linking each text file with a corresponding graphic;
- means for selecting text files relative to said first monitor screen;
- means for selecting one of the areas overlying a portion of a graphic relative to said second monitor screen for displaying a different graphic in the hierarchical organization;
- means for detecting each of the text files or areas of the graphics selected by said means for selecting and for controlling said means for storing to retrieve each of the selected text files or graphics and the graphic or text file linked to each of the selected text files or graphics, respectively, by said means for linking;
- means for displaying on said screens each of the text files or graphics selected by said means for selecting and the graphic or text file linked to each of the selected text files or graphics, thereby enabling the product structure to be searched through the hierarchical organization for an assembly, subassembly, or part needed for maintenance purposes;
- means for placing orders to purchase an assembly, subassembly, or part identified by a user from at least one of said screens;
- means for selecting said means for placing orders wherein said means for displaying displays on said first monitor screen the predetermined data associated with the identified assembly, subassembly, or part;
- second selection means for selecting from said means for placing orders a purchase order sequence and a request for quotation sequence for displaying price information for ordering and for quoting the price of the identified assembly, subassembly, or part, respectively; and
- means for enabling said second means for selecting when the text information is displayed on said first monitor screen.

17. An EMS work station as set forth in claim 16 wherein said second means for selecting includes a purchase order text screen and a request for quote text screen, both text screens being displayed on said first monitor screen.

18. An EMS work station as set forth in claim 16 including means for prompting the user to enter selected item numbers, a purchase order number, and a quantity to be ordered when a purchase order sequence is selected.

19. An EMS work station as set forth in claim 16 including means for prompting the user to enter a request for quotation number, an item number, and a quantity required when the request for quote sequence is selected.

20. An EMS work station as set forth in claim 18 wherein said means for prompting prompts the user to update a user stock number if any change has occurred.

21. An electronic maintenance support (EMS) work station comprising:

a first monitor screen for displaying text information related to a product having a plurality of parts, subassemblies, and assemblies;

a second monitor screen for displaying graphic illustrations of the assemblies, subassemblies, and parts of the product;

means for storing a plurality of text files, each text file containing predetermined data associated with an assembly, subassembly, or part of the product, the text files being arranged in an hierarchical organization of parts, subassemblies, and assemblies of the product;

means for storing a plurality of graphics, each graphic containing an illustration of an assembly, subassembly, or part within the hierarchical organization;

means for storing coordinate data defining areas of such size and location to enclose and overlie at least one of a graphic illustration of an assembly, subassembly, or part which may be selected for displaying assemblies, subassemblies, and parts in the hierarchical organization;

means for linking each text file with a coresponding graphic;

means for selecting text files relative to said first monitor screen;

means for selecting one of the areas overlying a portion of a graphic relative to said second monitor screen for displaying a different graphic in the hierarchical organization;

means for detecting each of the text files or areas of the graphics selected by said means for selecting and for controlling said means for storing to retrieve each of the selected text files or graphics and the graphic or text file linked to each of the selected text files or graphics, respectively, by said means for linking;

means for displaying on said screens each of the text files or graphics selected by said means for selecting and the graphic or text file linked to each of the selected text files or graphics, thereby enabling searching through the hierarchical organization for an assembly, subassembly, or part needed for maintenance purposes wherein said means for controlling responds to said means for selecting text to identify selected text; and means for graphically indicating on said second monitor screen the assembly, subassembly, or part corresponding to the selected text.

* * * * *